United States Patent

Oya et al.

[11] Patent Number: 5,394,986
[45] Date of Patent: Mar. 7, 1995

[54] CAN END TRAY

[75] Inventors: Kunihiko Oya, Kasukabe; Yasunori Asada, Omiya, both of Japan

[73] Assignee: Hokkai Can Co., Ltd., Tokyo, Japan

[21] Appl. No.: 231,979

[22] Filed: Apr. 21, 1994

Related U.S. Application Data

[63] Continuation of Ser. No. 24,307, Mar. 1, 1993, abandoned.

[51] Int. Cl.6 .............................................. B65D 85/00
[52] U.S. Cl. .................................. 206/445; 206/564; 206/804
[58] Field of Search ............... 206/445, 454, 562, 563, 206/564, 804, 815

[56] References Cited

U.S. PATENT DOCUMENTS

| | | | |
|---|---|---|---|
| 1,433,560 | 10/1922 | Lund | 206/804 |
| 3,306,462 | 2/1967 | Cruz | 206/564 |
| 3,398,828 | 8/1968 | Allen et al. | 206/564 |
| 3,591,032 | 7/1971 | Baxter | 206/564 |
| 3,740,238 | 6/1973 | Graham | |
| 3,856,137 | 12/1974 | Brindley | 206/564 |
| 3,926,305 | 12/1975 | Wallestad | 206/454 |
| 5,207,727 | 5/1983 | Pearce et al. | 206/564 |

FOREIGN PATENT DOCUMENTS

| | | |
|---|---|---|
| 531715 | 10/1956 | Canada .................. 206/445 |
| 0141938 | 8/1984 | European Pat. Off. . |
| 0312854 | 10/1988 | European Pat. Off. . |
| 0342825 | 8/1990 | European Pat. Off. . |
| 1301243 | 7/1962 | France . |
| 2502813 | 7/1976 | Germany . |
| 8704953 | 5/1987 | Germany . |
| 3934800 | 5/1990 | Germany . |
| 3-15341 | 6/1989 | Japan . |
| 187852 | 8/1991 | Japan .................. 206/445 |
| 1109015 | 4/1968 | United Kingdom . |

*Primary Examiner*—David T. Fidei

[57] ABSTRACT

A can end tray for storing a plurality of arrays of can ends while the can ends are being conveyed has a substantially rectangular upstanding side wall having a height at least equal to the diameter of the can ends, and a plurality of can end supports on a bottom of said side wall for supporting arrays of can ends thereon, said can end supports having a plurality of partitions for holding the arrays of can ends spaced from each other when the arrays of can ends are placed on said can end supports. A plurality of spacers are disposed on said side wall in longitudinal alignment with said can end supports for spacing said side wall and ends of the arrays of can ends from each other when the arrays of can ends are placed on said can end supports. When the arrays of can ends are placed on said can end supports, the spacers extend across the can ends on the ends of the arrays of can ends defining gaps between said side wall and the can ends on the ends of the arrays of can ends.

11 Claims, 10 Drawing Sheets

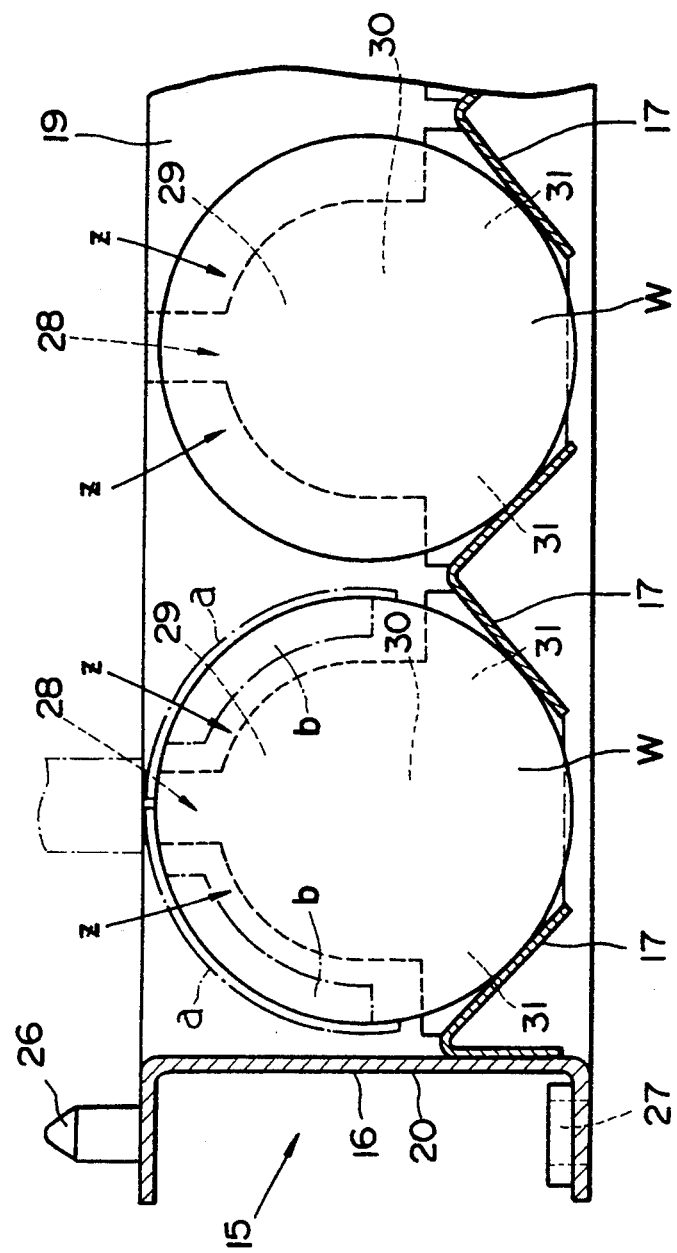

CAN END TRAY

This application is a continuation of application Ser. No. 08/024,307, filed on Mar. 1, 1993, now abandoned.

BACKGROUND OF THE INVENTION

1. Field of the Invention

The present invention relates to a tray for holding a plurality of can ends while they are being conveyed.

2. Description of the Prior Art

It has heretofore been known to convey a plurality of arrays of stacked can ends stored in a storage box.

Japanese laid-open utility model publication No. 3-15341 discloses such a storage box for storing can ends. The disclosed storage box is substantially in the shape of a rectangular parallelepiped that comprises a rectangular bottom plate and upstanding wall plates extending from peripheral edges of the bottom plate. Can ends are manually stored into the storage box by the worker. Specifically, horizontal arrays of can ends are successively placed on the bottom plate of the storage box. After the bottom plate is covered with one layer of can end arrays, another layer of horizontal arrays of can ends is piled up on the lower layer. Therefore, the storage box holds vertically successive layers of horizontal arrays of can ends.

Horizontal arrays of can ends may be efficiently placed into and removed from the storage box by a robot having a gripper. The gripper grips an array of can ends and takes it into and out of the storage box.

When the storage box stores can ends, it holds them in vertically successive layers of horizontal arrays, as described above. Therefore, adjacent can end arrays are closely held against each other in the storage box. The can end arrays that are closely packed in the storage box prevent the gripper from being inserted between the can end arrays. Consequently, it would be difficult for the robot to take can ends automatically into and out of the storage box.

The opposite can ends of each of the can end arrays stored in the storage box are held against the respective opposite wall plates thereof. When one of the can end arrays is removed from the storage box, a space is created laterally of those can end arrays which are positioned adjacent to the removed can end array. The remaining can end arrays tend to flex convexly toward the space and hence to be deformed out of a desired shape.

Since the can end arrays are held in contact in the storage box, the contacting can end arrays are liable to damage each other when vibrated during shipment.

SUMMARY OF THE INVENTION

It is an object of the present invention to provide a can end tray for storing a large number of can ends while they are being conveyed, the can end tray being arranged for easy automatization of a process of taking can ends into and out of the can end tray.

According to the present invention, the above object can be achieved by a can end tray for storing a plurality of arrays of can ends while the can ends are being conveyed, comprising a substantially rectangular upstanding side wall having a height at least equal to the diameter of the can ends, a plurality of can end supports on a bottom of the side wall for supporting arrays of can ends thereon, the can end supports having a plurality of partitions for holding the arrays of can ends spaced from each other when the arrays of can ends are placed on the can end supports, and a plurality of spacers disposed on the side wall in longitudinal alignment with the can end supports for spacing the side wall and ends of the arrays of can ends from each other when the arrays of can ends are placed on the can end supports, the spacers being arranged such that when the arrays of can ends are placed on the can end supports, the spacers extend across the can ends on the ends of the arrays of can ends, defining gaps between the side wall and the can ends on the ends of the arrays of can ends.

The can end tray may be used with a gripper having a pair of gripper arms movable toward and away from each other for gripping the arrays of can ends, one at a time, in the longitudinal direction thereof, and a pair of engaging plates joined to each end of the gripper arms for engaging one end of each of the arrays of can ends. The partitions define gaps therebetween for allowing the gripper arms as they move away from each other to be inserted therein between adjacent arrays of can ends, and the spacers define gaps between the side wall and the can ends on the ends of the arrays of can ends supported on the can end supports, for allowing the engaging plates to be inserted therein.

When the can end arrays are supported on the can end supports, they are held in position by the partitions so that adjacent can end arrays are prevented from contacting each other. When a can end array is gripped by the gripper, the gripper arms are inserted into gaps defined by the partitions, and the can end array can easily be gripped longitudinally by the engaging plates of the gripper.

Each of the spacers has a first abutting portion for vertically abutting against the can end on one of the ends of the arrays of can ends to prevent the can ends from falling, and a second abutting portion for horizontally abutting against the can end on one of the ends of the arrays of can ends for preventing the can ends from swinging.

The side wall has a downwardly projecting beaded edge on a lower portion thereof and a recess defined in an upper portion in vertical alignment with the beaded edge. A plurality of can end trays may be stacked stably and securely with the beaded edge of a lower can end tray being snugly received in the recess of an immediately upper can end tray.

Alternatively, the side wall has a plurality of pins disposed on an upper surface thereof at respective corners thereof and a plurality of holes defined in a lower surface thereof at the respective corners in vertical alignment with the pins, respectively. A plurality of can end trays may be stacked stably and securely with the pins of a lower can end tray being snugly received in the respective holes of an immediately upper can end tray.

The side wall may be substantially in a cross-sectional shape of an inverted U for allowing the worker to easily hold the side wall to carry the can end tray.

The above and other objects, features, and advantages of the present invention will become apparent from the following description when taken in conjunction with the accompanying drawings which illustrate preferred embodiments of the present invention by way of example.

BRIEF DESCRIPTION OF THE DRAWINGS

FIG. 10 is a perspective view of a can end tray according to a fourth embodiment of the present invention.

DETAILED DESCRIPTION OF THE PREFERRED EMBODIMENTS

FIGS. 1 through 4 show a can end tray according to a first embodiment of the present invention.

Figure 4:
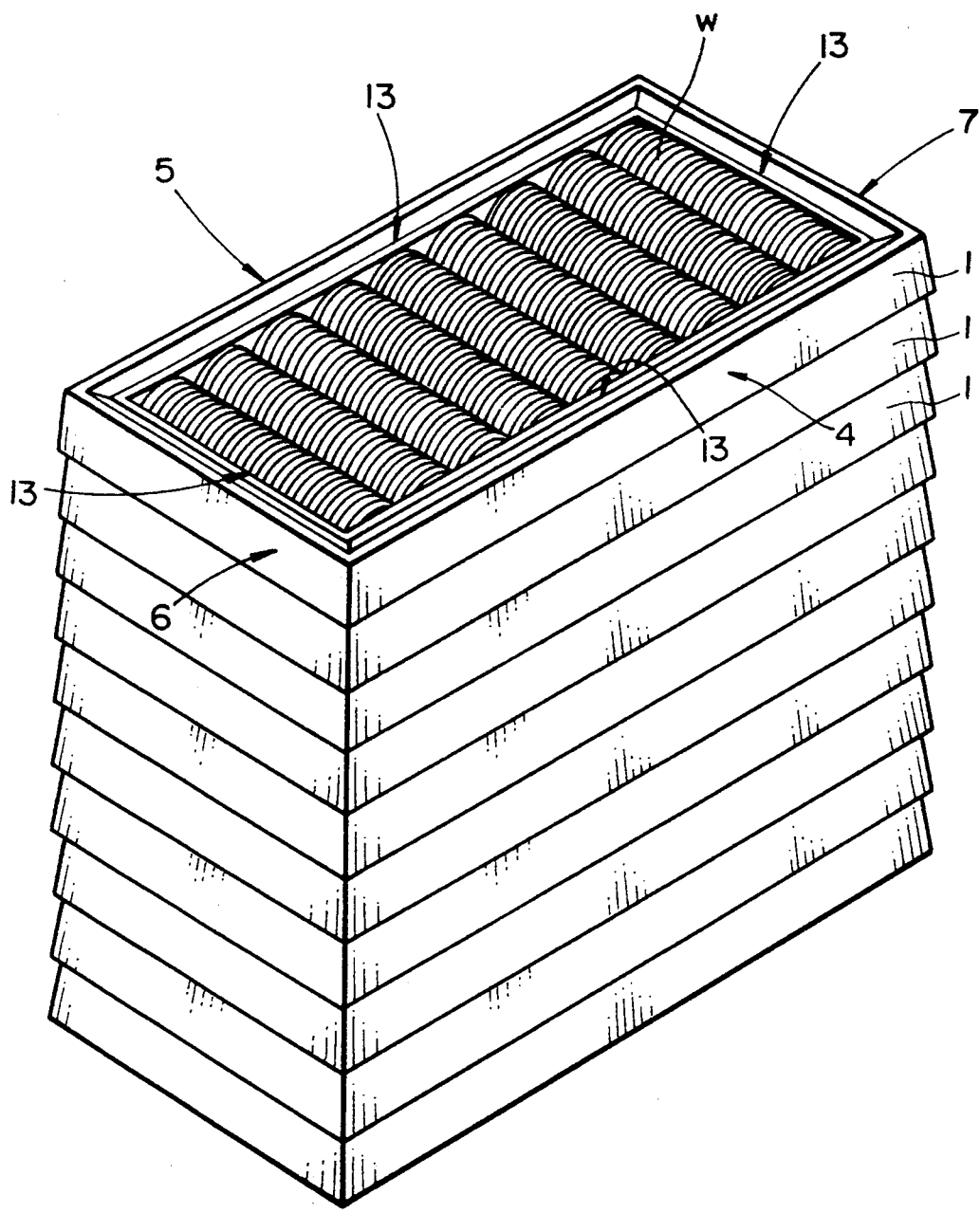
FIG. 4 is a perspective view of a stack of can end trays according to the first embodiment.

As shown in FIG. 4, a plurality of can end trays according to the first embodiment are stacked to store a stack of layers of horizontal arrays of disk-shaped can ends w.

Figure 1:
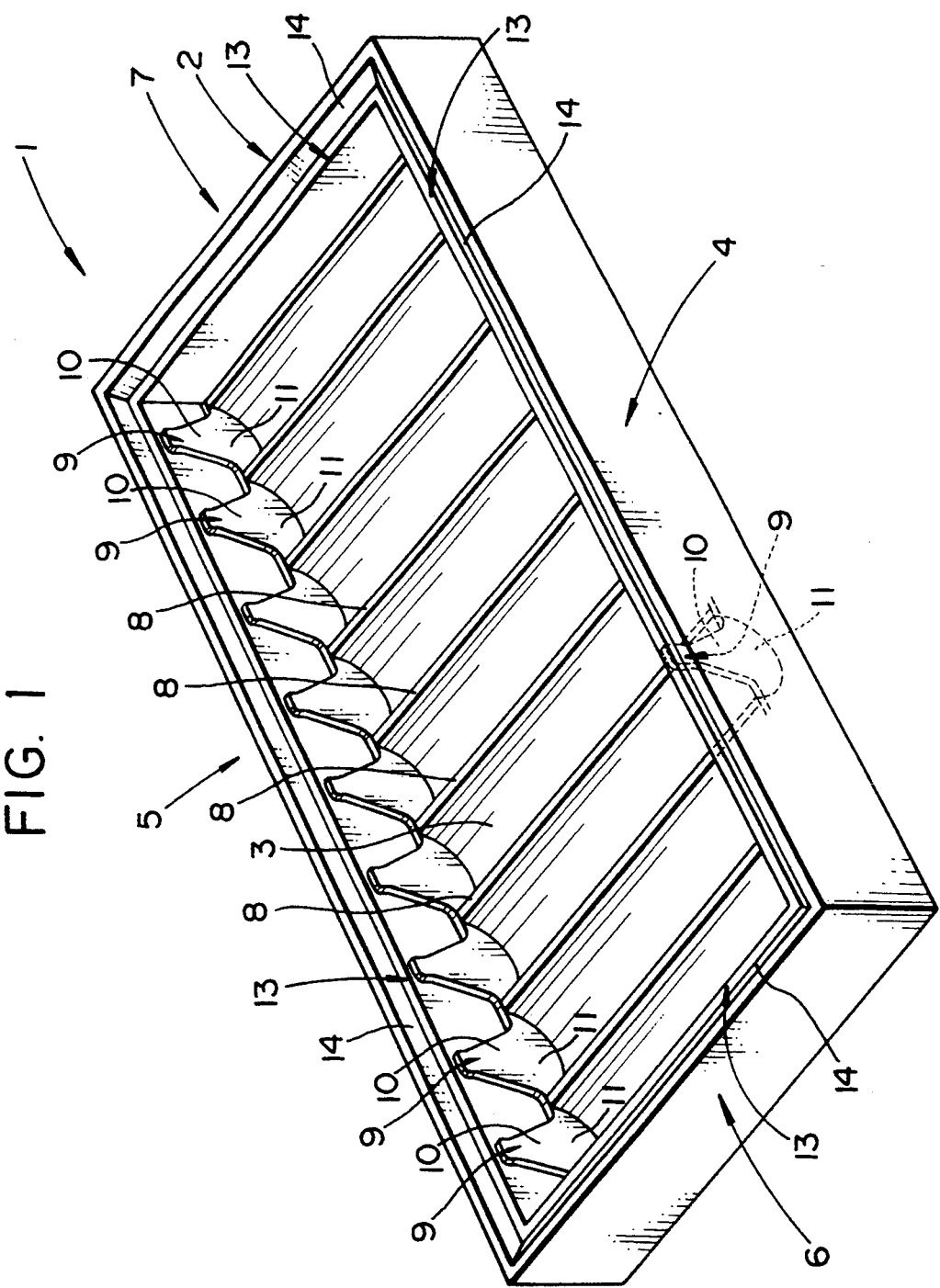
FIG. 1 is a perspective view of a can end tray according to a first embodiment of the present invention.

As shown in FIG. 1, each of the can end trays, generally designated by the reference numeral 1, for storing horizontal arrays of can ends w is of an integral structure molded of synthetic resin which comprises a rectangular side wall 2 and a bottom wall joined thereto as can end supports 3.

The side wall 2, which is of a rectangular shape when viewed in plan, comprises a pair of upstanding side walls 4, 5 extending from front and rear longitudinal ends thereof in confronting relationship to each other, and a pair of upstanding side walls 6, 7 extending from transverse side edges thereof in confronting relationship to each other and joined end to end to the side walls 4, 5. The side walls 4, 5, 6, 7 have a height equal to or larger than the diameter of can ends to be stored in the can end tray 1.

The can end supports 3 are defined by a plurality of parallel spaced partitions 8 of an inverted U cross-sectional shape for holding a lower portion of each of can ends w in each array, which is about ⅓ of the entire area of the each can end w, between adjacent partitions 8. When arrays of can ends w are placed between the partitions 8, adjacent can end arrays are prevented from contacting each other by the partition 8 positioned therebetween.

Figure 2:
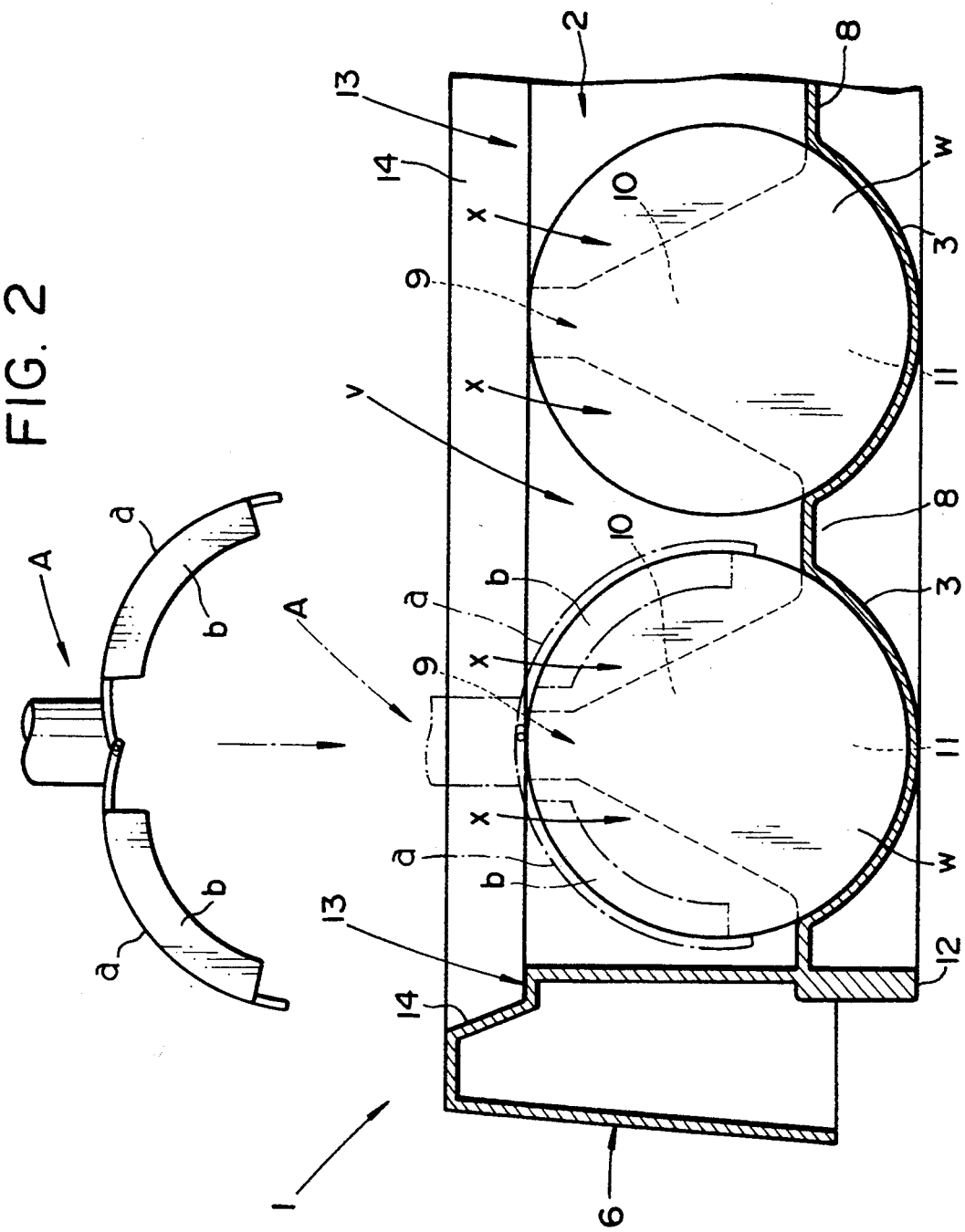
FIG. 2 is an enlarged fragmentary cross-sectional view of the can end tray shown in FIG. 1.
Figure 3:
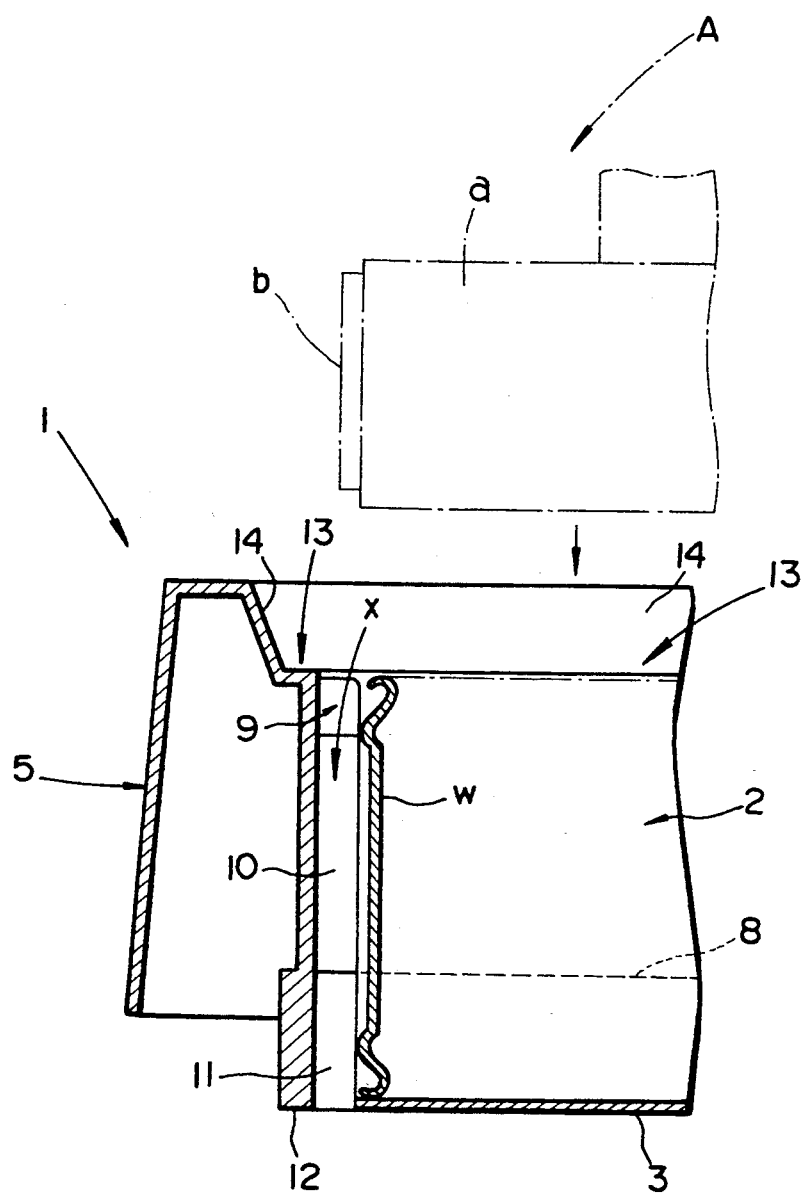
FIG. 3 is an enlarged fragmentary cross-sectional view of the can end tray shown in FIG. 1.

As shown in FIGS. 2 and 3, spacers 9 are disposed on inner confronting surfaces of the side walls 4, 5 in longitudinal alignment with the can end supports 3.

Each of the spacers 9 is substantially in the shape of a triangle and has a first abutting portion 10 for vertically abutting against an upper side surface of the can end on each of the opposite ends of a can end array supported on one of the can end supports 3, and a second abutting portion 11 for horizontally abutting against a lower side surface of the can end on each of the opposite ends of the can end array. The first abutting portion 10 is positioned upwardly of, and integral with, the second abutting portion 11. Therefore, the spacers 9 extend diametrically across the can ends on the opposite ends of the can end arrays.

When the can end arrays are placed on the can end supports 3, the can ends w on the opposite ends of the can end arrays are prevented from falling by the first abutting portions 10 and also from swinging by the second abutting portions 11, so that the can ends w can reliably be held on the can end supports 3. Gaps x are defined between the can end arrays and the inner surfaces of the side walls 4, 5 in regions where the can ends w are held out of contact with the first abutting portions 10.

As shown in FIGS. 2 and 3, the gaps x allow engaging plates b of a gripper A to be inserted therein when an array of can ends w is to be gripped in its longitudinal direction by a pair of gripper arms a joined at each end thereof to the engaging plates b. The gripper arms a are angularly movable toward and away from each other. More specifically, when a robot is used to automatically bring can ends w into the can end tray 1, the gripper A, which is mounted on the robot arm, grips and transfers the can end array onto the can end tray 1. Since a gap v is defined between adjacent can end arrays by a partition 8, when the gripper arms a grip the can end array as indicated by the imaginary lines in FIG. 2, the gripper arms a as they move away from each other do not interfere with adjacent can end arrays. Inasmuch the gaps x are also defined between the can end array and the inner surfaces of the first side walls 4, 5 by the spacers 9, the engaging plates b do not interfere with the can end array and the first side walls 4, 5 when the gripper arms a grip the can end array as indicated by the imaginary lines in FIG. 2. Consequently, the can end array can smoothly be transferred into the can end tray 1 by the gripper A.

The first abutting portions 10 are integrally formed with the respective second abutting portions 11. Therefore, when an array of can ends w is to be placed on the can end supports 3, the can ends on the opposite ends of the can end array are guided by the first abutting portions 10 in sliding contact therewith. The can end array can thus smoothly be placed onto the can end supports 3.

As shown in FIGS. 1 through 3, each of the side walls 4, 5, 6, 7 is substantially in the cross-sectional shape of an inverted U that allows the worker to easily hold the side walls 4, 5, 6, 7 to carry the can end tray 1. Each of the side walls 4, 5, 6, 7 has a beaded edge 12 on its lower inner portion, the beaded edge 12 projecting downwardly into horizontal alignment with the bottom of the can end supports 3. Each of the side walls 4, 5, 6, 7 also has a recess 13 on its upper inner portion above the beaded edge 12 in vertical alignment therewith. When a plurality of can end trays 1 with can end arrays stored therein are stacked as shown in FIG. 4, the recesses 13 of a lower can end tray 1 snugly receive the respective beaded edges 12 of an immediately upper can end tray 1. Therefore, the stacked can end trays 1 are properly positioned and securely held together. As shown in FIGS. 2 and 3, each of the side walls 4, 5, 6, 7 also has a slanted guide surface 14 extending outwardly of the corresponding recess 13 for smoothly guiding the beaded edge 12 into the recess 13.

Figure 5:
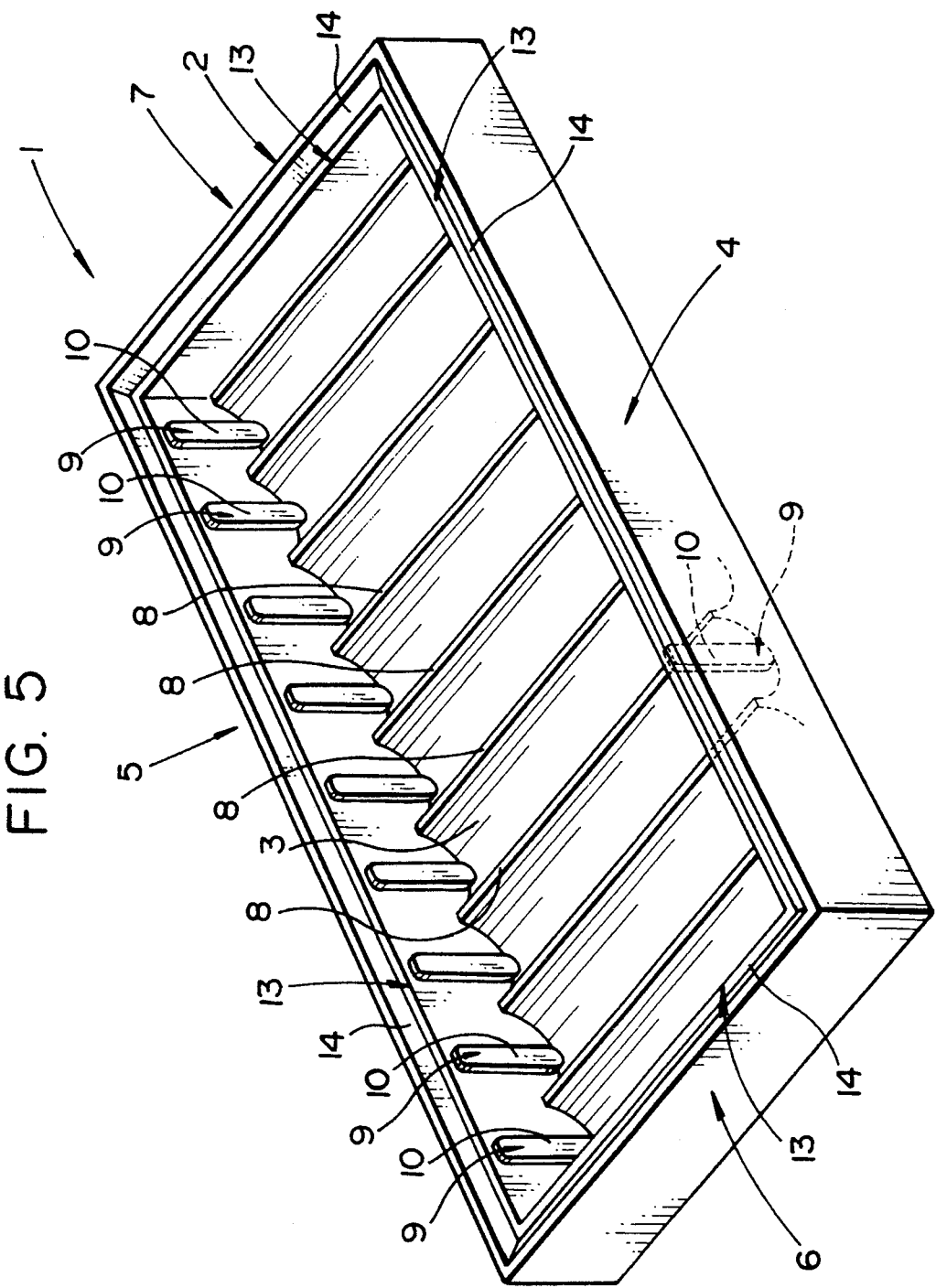
FIG. 5 is a perspective view of a can end tray according to a second embodiment of the present invention.

FIG. 5 shows a can end tray 1 according to a second embodiment of the present invention. The can end tray 1 shown in FIG. 5 differs from the can end tray 1 shown in FIGS. 1 through 4 in that each of the spacers 9 is substantially of a rectangular shape that extends vertically. The spacers 9 do not have the second abutting portions 11 shown in FIGS. 1 and 2, but only have the first abutting portions 10 for vertically abutting against side surfaces of the can ends on the opposite sides of can end arrays. When an array of can ends w is placed on the can end supports 3, the ends on the opposite ends of the can end array are prevented from falling by the first abutting portions 10. Gaps defined between the side wall 2 and the can end arrays permit the gripper A to easily grip the can end arrays.

A can end tray according to a third embodiment of the present invention will be described below with reference to FIGS. 6 through 9.

Figure 9:
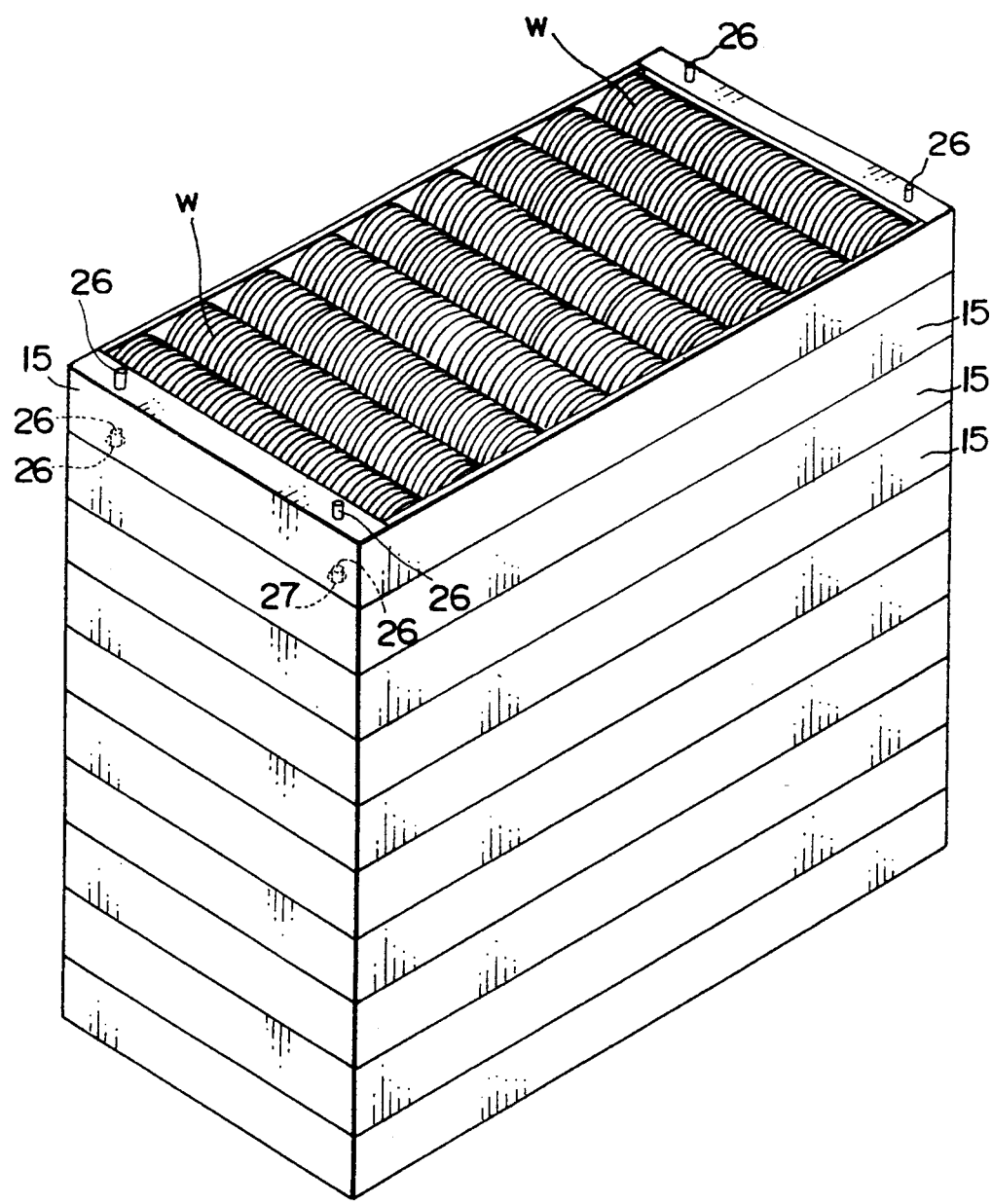
FIG. 9 is a perspective view of a stack of can end trays according to the third embodiment.

As shown in FIG. 9, a plurality of can end trays according to the third embodiment are stacked to store a stack of layers of horizontal arrays of disk-shaped can ends w.

Figure 6:
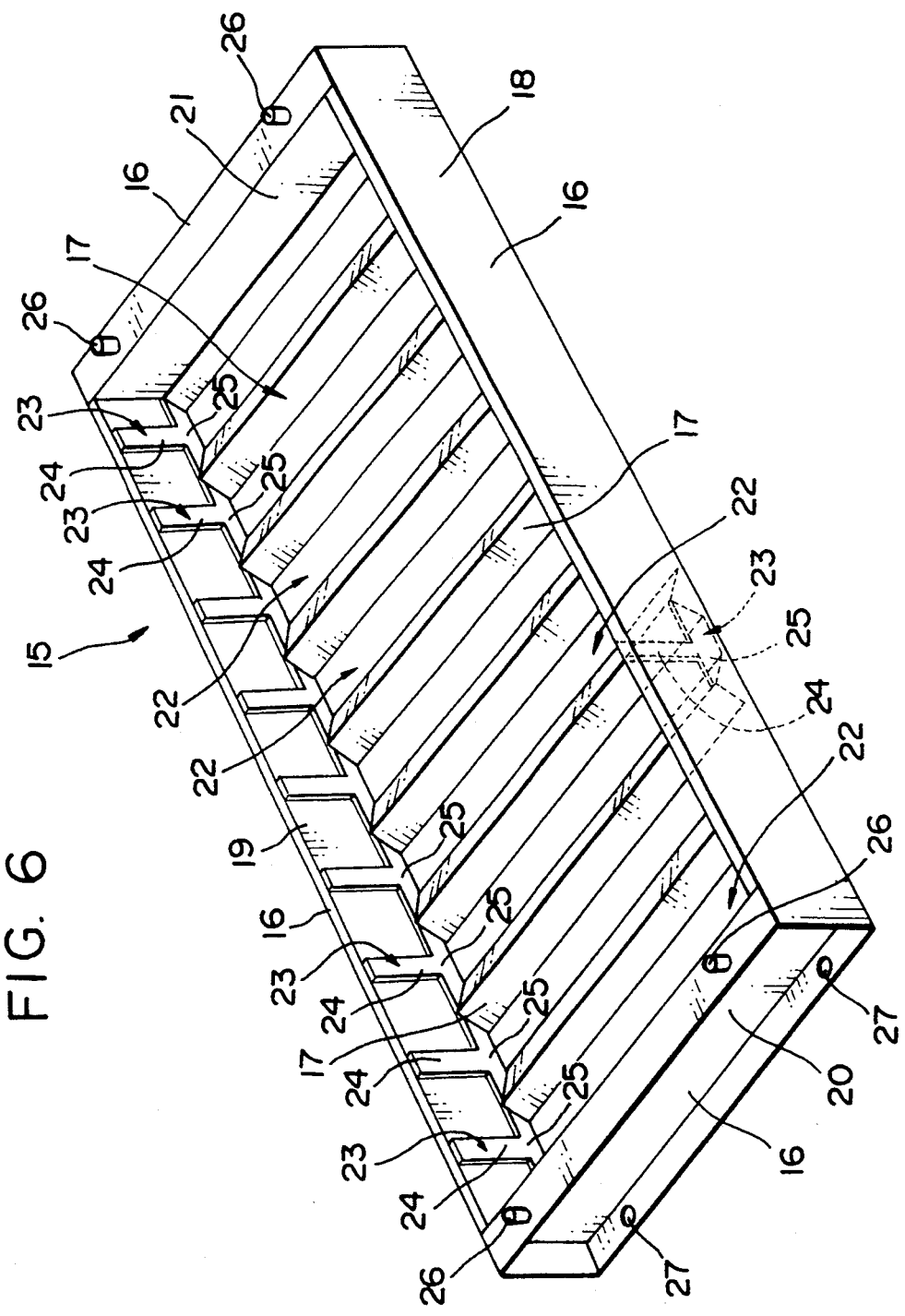
FIG. 6 is a perspective view of a can end tray according to a third embodiment of the present invention.

As shown in FIG. 6, each can end tray, generally denoted at 15, for storing horizontal arrays of can ends w comprises a rectangular side wall 16 and a plurality of parallel spaced partitions 17 disposed in and joined to the side wall 16.

The side wall 16, which is of a rectangular shape when viewed in plan, comprises a pair of upstanding side walls 18, 19 extending from front and rear longitudinal ends thereof in confronting relationship to each other, and a pair of upstanding side walls 20, 21 extending from transverse side edges thereof in confronting relationship to each other and joined end to end to the side walls 18, 19. The side walls 18, 19, 20, 21 have a height equal to or larger than the diameter of can ends to be stored in the can end tray 15.

Each of the partitions 17 is of an inverted V cross-sectional shape, and has opposite ends fixed to inner confronting surfaces of the first side walls 18, 19, respectively. Adjacent two of the partitions 19 can hold an array of can ends w. The partitions 19 jointly provide can end supports 22 for supporting can end arrays such that adjacent can end arrays are laterally spaced from, i.e., held out of contact with, each other.

Figure 7:
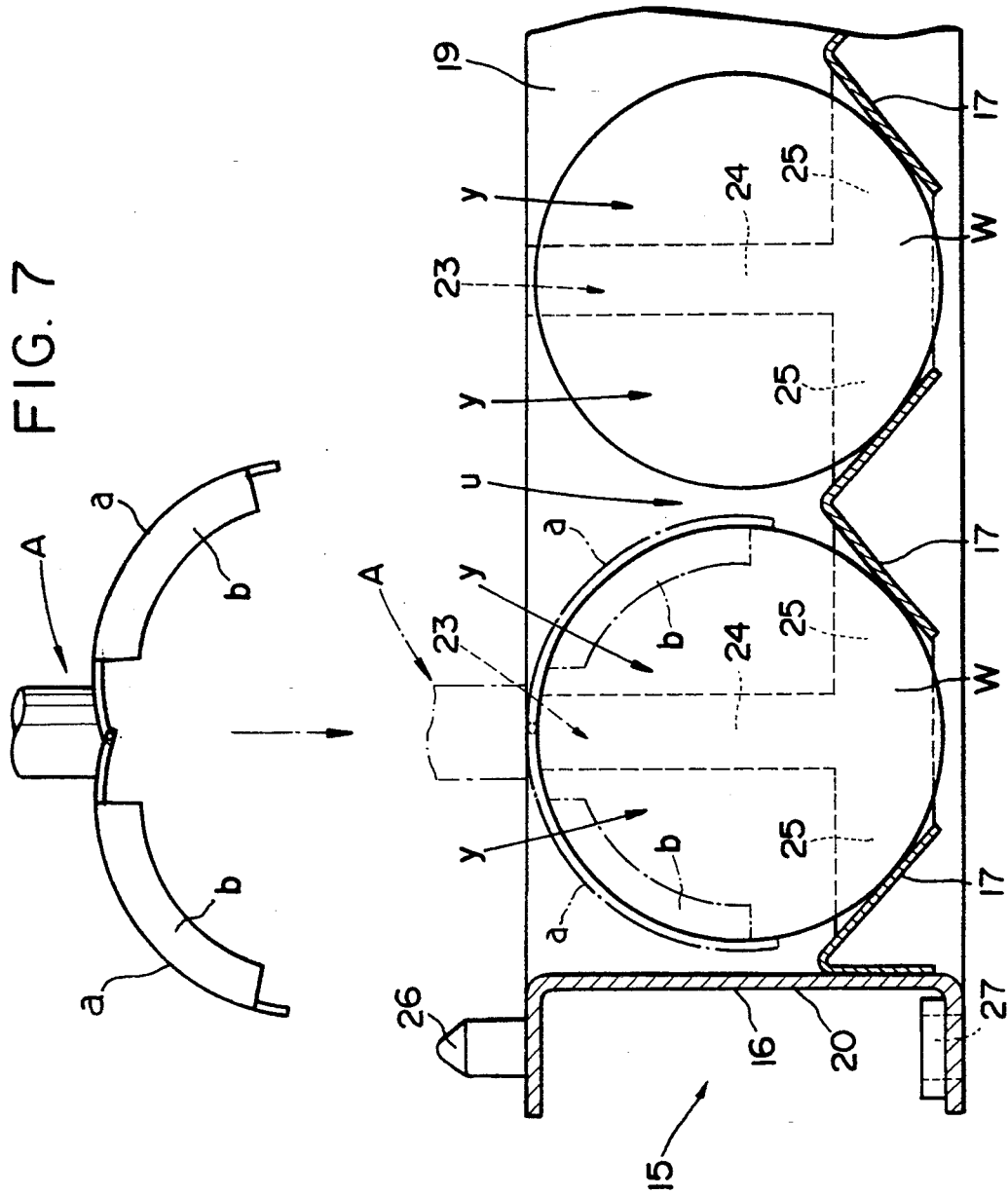
FIG. 7 is an enlarged fragmentary cross-sectional view of the can end tray shown in FIG. 6.
Figure 8:
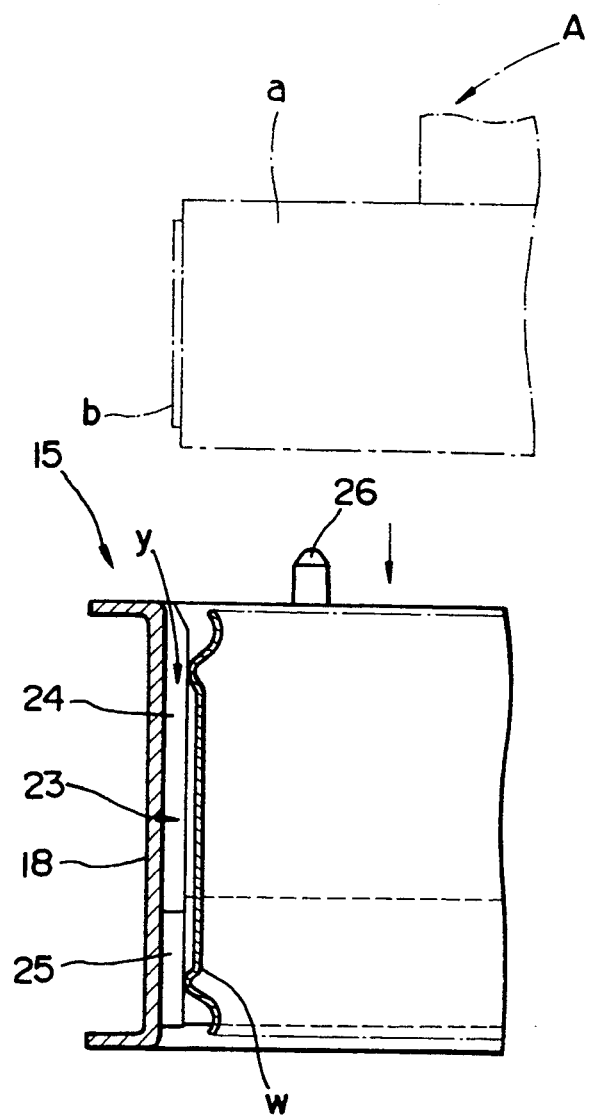
FIG. 8 is an enlarged fragmentary cross-sectional view of the can end tray shown in FIG. 6.

As shown in FIGS. 7 and 8, spacers 23 are disposed on inner confronting surfaces of the side walls 18, 19.

Each of the spacers 23 is substantially in the shape of an inverted T and has a first abutting portion 24 for vertically abutting against a side surface of the can end on each of the opposite ends of a can end array supported on one of the can end supports 22, and a second abutting portion 25 for horizontally abutting against a lower side surface of the can end on each of the opposite ends of the can end array. The first abutting portion 24 is positioned upwardly of, and integral with, the second abutting portion 25. Therefore, the spacers 23 extend diametrically across the can ends on the opposite ends of the can end arrays.

When the can end arrays are placed on the can end supports 22, the can ends w on the opposite ends of the can end arrays are prevented from falling by the first abutting portions 24 and also from swinging by the second abutting portions 25, so that the can ends w can reliably be held on the can end supports 22. Gaps y are defined between the can end arrays and the inner surfaces of the side walls 18, 19 in regions where the can ends w are held out of contact with the first abutting portions 24.

As shown in FIGS. 7 and 8, the gaps y allow engaging plates b of a gripper A to be inserted therein when an array of can ends w is to be gripped by a pair of gripper arms a joined to the engaging plates b. More specifically, when a robot is used to automatically bring can ends w into the can end tray 15, the gripper A, which is mounted on the robot arm, grips and transfers the can end array onto the can end tray 15. Since a gap u is defined between adjacent can end arrays by a partition 17, when the gripper arms a grip the can end array as indicated by the imaginary lines in FIG. 7, the gripper arms a do not interfere with adjacent can end arrays. Inasmuch the gaps y are also defined between the can end array and the inner surfaces of the first side walls 18, 19 by the spacers 23, the engaging plates b do not interfere with the can end array and the first side walls 18, 19 when the gripper arms a grip the can end array as indicated by the imaginary lines in FIG. 7. Consequently, the can end array can smoothly be transferred into the can end tray 15 by the gripper A.

As shown in FIG. 6, each of the second side walls 20, 21 has a pair of spaced pins 26 mounted on an upper surface thereof and a pair of holes 27 defined in a lower surface thereof in vertical alignment with the pins 26, respectively. The pins 26 and the holes 27 are positioned at respective corners of the rectangular side wall 16. The holes 27 are shaped complementarily to the pins 26 so that the holes 27 can snugly receive the pins 26. When a plurality of can end trays 15 with can end arrays stored therein are stacked as shown in FIG. 9, the pins 26 of a lower can end tray 15 are snugly received in the respective holes 27 of an immediately upper can end tray 15. Therefore, the stacked can end trays 15 are properly positioned and securely held together. The can ends on the opposite ends of the can end arrays stored in the can end tray 15 are prevented from falling and being positionally displaced by the spacers 23. Therefore, a number of vertical layers of horizontal arrays of can ends w can be held and conveyed reliably and stably by a plurality of can end trays 15.

FIG. 10 shows a can end tray 15 according to a fourth embodiment of the present invention. The can end tray 15 shown in FIG. 10 differs from the can end tray 15 shown in FIGS. 6 through 9 in that spacers 28 are disposed on the inner surfaces of the first side walls 18, 19, defining gaps z shaped complementarily to the engaging portions b of the gripper A. More specifically, each of the spacers 28 has a central abutting portion 30 for abutting against a central portion of a can end, and the gaps z are defined by arcuate outer edges of the central abutting portion 30 so as to be positioned at opposite sides of an upper portion of the can end Each of the spacers 28 also has a first abutting portion 29 integral with the central abutting portion 30 for vertically abutting against a side surface of the can end on one end of a can end array, and a second abutting portion 31 integral with the central abutting portion 30 for horizontally abutting against a side surface of the can end.

When the can end arrays are placed on the can end supports 22, the can ends w on the opposite ends of the can end arrays are prevented from falling and swinging by the first abutting portions 29, the second abutting portions 31, and the central abutting portions 30, so that the can ends w can reliably be held on the can end supports 22. The gaps z permit the gripper A to grip the can end arrays with ease.

Although certain preferred embodiments of the present invention have been shown and described in detail, it should be understood that various changes and modifications may be made therein without departing from the scope of the appended claims.

What is claimed is:

1. In combination a plurality of arrays of can ends, each of said can ends having two substantially circular faces, each of said faces having a predetermined diameter, said can ends further having circumferential side portions which connect said two faces, and a can end tray for storing said plurality of arrays of can ends while the can ends are being conveyed, said can end tray comprising:
 a plurality of substantially rectangular upstanding side walls having a height at least equal to said predetermined diameter of the can ends;
 a plurality of can end supports attached to a bottom of said plurality of side walls for supporting said arrays of can ends on the can end circumferential side portions, said can end supports having a plurality of partitions which extend longitudinally between two of said plurality of side walls for holding the arrays of can ends spaced from each other when the arrays of can ends are placed on said can end supports; and
 a plurality of spacers disposed on said two of said plurality of side walls in longitudinal alignment with said can end supports for spacing said two of said plurality of side walls and ends of the arrays of can ends from each other when the arrays of can ends are placed on said can end supports, said spacers being arranged such that when the arrays of can ends are placed on said can end supports, the spacers extend across a center of a face of said can ends on the two ends of the arrays of can ends, defining gaps between said two of said plurality of side walls and the can ends on the ends of the arrays of can ends, wherein said gaps are defined at least along said circumferential side portions of said can ends on the ends of said arrays on respective sides of said spacers.

2. The combination according to claim 1, wherein each of said spacers are substantially rectangular in shape for defining gaps between said two of said plurality of side walls and opposite side portions of one of the can ends on the ends of the arrays of can ends.

3. The combination according to claim 1, wherein each of said spacers comprises a vertically extending first abutting portion for vertically abutting against the can end on one of the ends of the arrays of can ends, defining gaps between said two of said plurality of side walls and opposite side portions of the can end, when the arrays of can ends are placed on said can end supports, and a horizontally extending second abutting portion for horizontally abutting against the can end on one of the ends of the arrays of can ends when the arrays of can ends are placed on said can end supports.

4. The combination according to claim 1, for use with a gripper having a pair of gripper arms movable toward and away from each other for gripping the arrays of can ends, one at a time, in the longitudinal direction thereof, and a pair of engaging plates joined to each end of said gripper arms for engaging one end of each of the arrays of can ends, wherein
 said partitions define gaps therebetween for allowing the gripper arms as they move away from each other to be inserted therein between adjacent arrays of can ends; and
 said spacers define gaps between said side wall and the can ends on the ends of the arrays of can ends supported on said can end supports, for allowing the engaging plates to be inserted therein.

5. In combination a plurality of arrays of can ends, each of said can ends having two substantially circular faces, each of said faces having a predetermined diameter, said can ends further having circumferential side portions which connect said two faces, and a can end tray for storing said plurality of arrays of can ends while the can ends are being conveyed, said can end tray comprising:
 a plurality of substantially rectangular upstanding side walls having a height at least equal to said predetermined diameter of the can ends;
 a plurality of can end supports attached to a bottom of said plurality of side walls for supporting said arrays of can ends on the can end circumferential side portions, said can end supports having a plurality of partitions which extend longitudinally between two of said plurality of side walls for holding the arrays of can ends spaced from each other when the arrays of can ends are placed on said can end supports; and
 a plurality of spacers disposed on said two of said plurality of side walls in longitudinal alignment with said can end supports for spacing said two of said plurality of side walls and ends of the arrays of can ends from each other when the arrays of can ends are placed on said can end supports, said spacers being arranged such that when the arrays of can ends are placed on said can end supports, the spacers extend across a center of a face of said can ends on the two ends of the arrays of can ends, defining gaps between said two of said plurality of side walls and the can ends on the ends of the arrays of can ends, wherein said gaps are defined at least along said circumferential side portions of said can ends on the ends of said arrays on respective sides of said spacers;
 wherein said first and second abutting portions of each of said spacers are jointly of a substantially triangular shape.

6. In combination a plurality of arrays of can ends, each of said can ends having two substantially circular faces, each of said faces having a predetermined diameter, said can ends further having circumferential side portions which connect said two faces, and a can end tray for storing said plurality of arrays of can ends while the can ends are being conveyed, said can end tray comprising:
 a plurality of substantially rectangular upstanding side walls having a height at least equal to said predetermined diameter of the can ends;
 a plurality of can end supports attached to a bottom of said plurality of side walls for supporting said arrays of can ends on the can end circumferential side portions, said can end supports having a plurality of partitions which extend longitudinally between two of said plurality of side walls for holding the arrays of can ends spaced from each other when the armsays of can ends are placed on said can end supports; and
 a plurality of spacers disposed on said two of said plurality of side walls in longitudinal alignment with said can end supports for spacing said two of said plurality of side walls and ends of the arrays of can ends from each other when the arrays of can ends are placed on said can end supports, said spacers being arranged such that when the arrays of can ends are placed on said can end supports, the spacers extend across a center of a face of said can ends on the two ends of the arrays of can ends, defining gaps between said two of said plurality of side walls and the can ends on the ends of the arrays of can ends, wherein said gaps are defined at least along said circumferential side portions of said can ends on the ends of said arrays on respective sides of said spacers;

wherein said first and second abutting portions of each of said spacers are jointly of a substantially inverted T shape.

7. The combination according to claim 1, wherein each of said spacers has an abutting portion for abutting against a central portion of a can end face on one end of each of the arrays of can ends, defining gaps between the side wall and opposite portions of said can end.

8. The combination according to claim 1, wherein said plurality of side walls each have a downwardly projecting beaded edge of a lower portion thereof and a recess defined in an upper portion in vertical alignment with said beaded edge.

9. The combination according to claim 8, wherein said beaded edge and said recess extend fully along said plurality of side walls.

10. The combination of claim 1, wherein said plurality of side walls have a plurality of pins disposed on upper surfaces thereof at respective corners thereof and a plurality of holes defined in lower surfaces thereof at the respective corners in vertical alignment with said pins, respectively.

11. The combination according to claim 1, wherein each of said plurality of side walls is substantially in a cross-sectional shape of an inverted U.

* * * * *